Nov. 17, 1964 W. A. RAY 3,157,831
LAMINATED CORE ELECTROMAGNET
Filed March 30, 1959 4 Sheets-Sheet 1
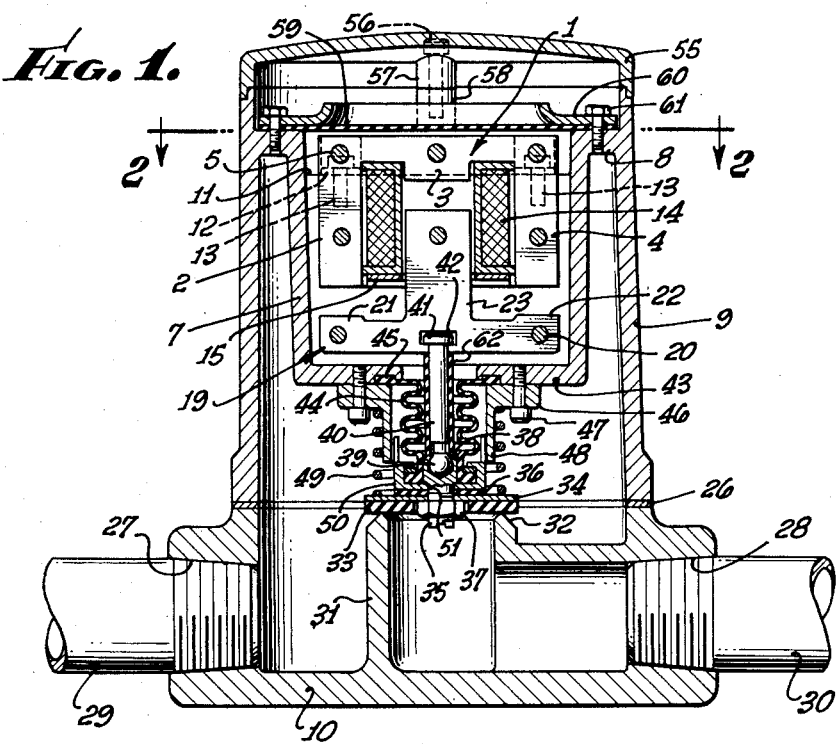
FIG. 1.
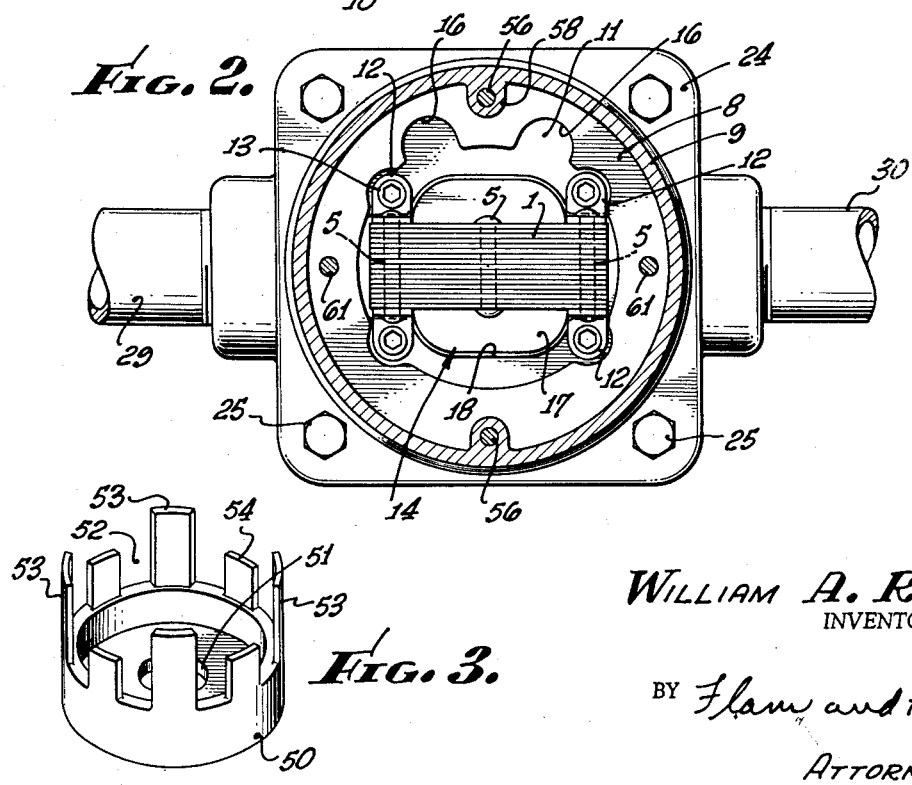
FIG. 2.
FIG. 3.
WILLIAM A. RAY
INVENTOR.
BY Flam and Flam
ATTORNEYS.

Nov. 17, 1964 W. A. RAY 3,157,831
LAMINATED CORE ELECTROMAGNET
Filed March 30, 1959 4 Sheets-Sheet 3

WILLIAM A. RAY
INVENTOR.

BY Flam and Flam
ATTORNEYS.

Nov. 17, 1964 W. A. RAY 3,157,831
LAMINATED CORE ELECTROMAGNET
Filed March 30, 1959 4 Sheets-Sheet 4

WILLIAM A. RAY
INVENTOR.

BY Flam and Flam
ATTORNEYS.

United States Patent Office 3,157,831
Patented Nov. 17, 1964

3,157,831
LAMINATED CORE ELECTROMAGNET
William A. Ray, North Hollywood, Calif., assignor to International Telephone and Telegraph Corporation, Baltimore, Md., a corporation of Maryland
Filed Mar. 30, 1959, Ser. No. 802,922
29 Claims. (Cl. 317—165)

This invention relates to electromagnets, and particularly to such apparatus having a plunger to exert a pull and thereby operate as an actuator.

It is one of the objects of this invention to provide a simplified and compact electromagnet of this character, and especially one adapted to be operated efficiently by alternating current.

It is another object of this invention to provide an electromagnetic actuator that can be advantageously utilized for moving a valve closure between closed and open positions.

Often the moving parts of an electromagnet are covered by a damping liquid, such as oil or silicone. In this way, humming due to the use of alternating current is greatly reduced. It is still another object of this invention to make it possible entirely to enclose these parts and the damping liquid in a sealed container and yet ensure against undue liquid pressure within the container as the electromagnet is energized to active position.

In order to transmit the movement of the magnet plunger through an otherwise impervious wall, a seal may be used, surrounding a link or actuator connected to the plunger or armature of the magnet. Such a sealing element may be a flexible bellows. It is still another object of this invention to make it possible to use a bellows that quite closely encompasses the link, without the material danger that the bellows can be worn through by rubbing or frictional contact with the link.

The sealing off of the actuator and the electromagnet is particularly important when the electromagnet controls the opening or closing of a valve that passes fluid fuel. Under such circumstances, the bellows completes an impervious barrier against influx of the fuel into the electromagnet.

It is still another object of this invention to make it possible to simplify the separation of the electromagnet parts from the gaseous fuel; and particularly without the aid of expandable bellows structures.

This invention possesses many other advantages, and has other objects which may be made more clearly apparent from a consideration of several embodiments of the invention. For this purpose, there are shown a few forms in the drawings accompanying and forming part of the present specification. These forms will now be described in detail, illustrating the general principles of the invention; but it is to be understood that this detailed description is not to be taken in a limiting sense, since the scope of the invention is best defined by the appended claims.

Referring to the drawings:

FIGURE 1 is a vertical sectional view of an electromagnet incorporating the invention shown as operating a valve;

FIG. 2 is a sectional view, taken along a plane corresponding to line 2—2 of FIG. 1;

FIG. 3 is a pictorial view of one of the elements utilized in the form shown in FIGS. 1 and 2;

FIG. 7 is a sectional view taken along a plane corresponding to line 7—7 of FIG. 4.

Figure 4:
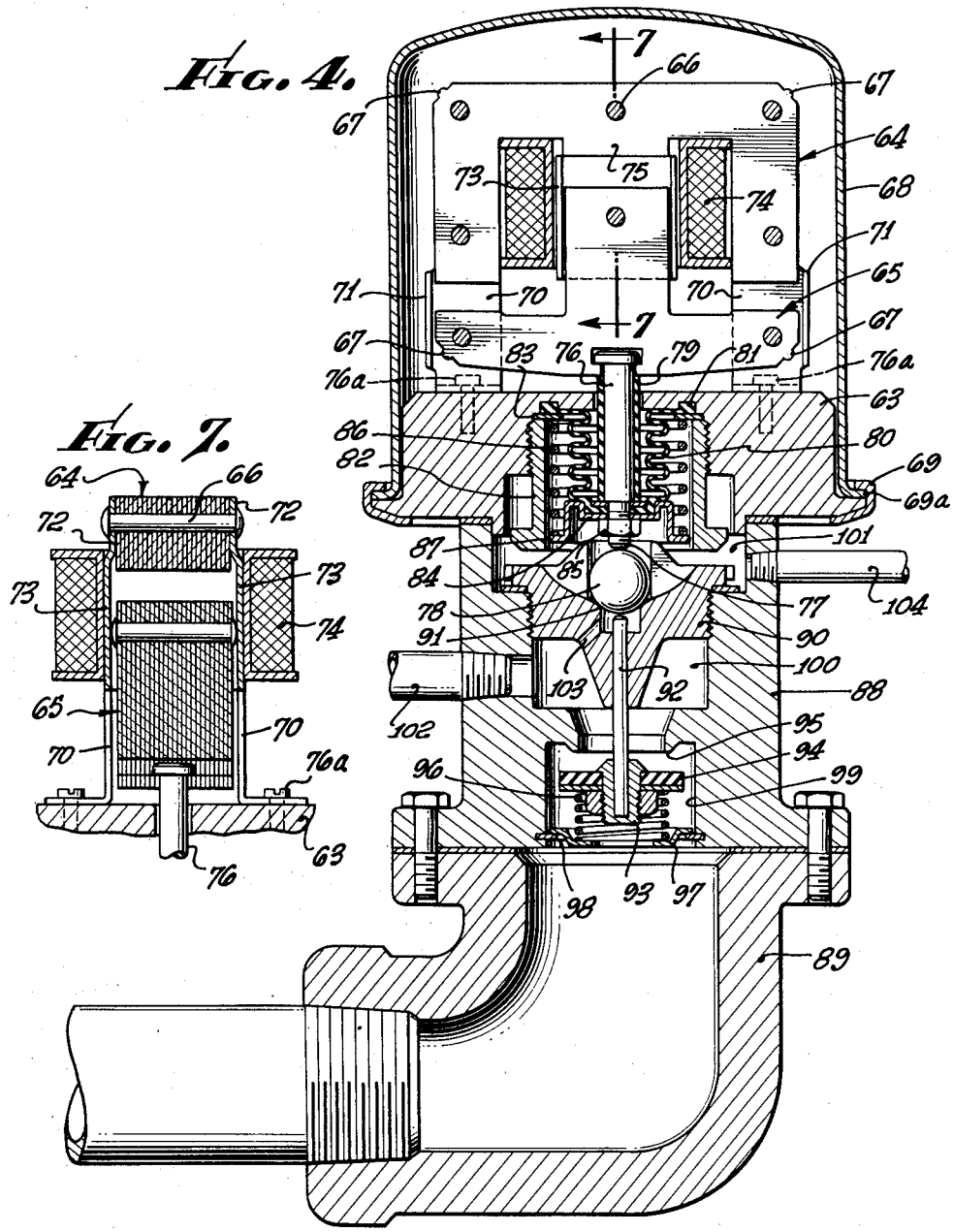
FIG. 4 is a view, similar to FIG. 1, of a modified form of the invention.

In the form shown in FIGS. 1, 2 and 3 there is provided a laminated core 1 having three legs 2, 3 and 4. The outer legs 2 and 4 are much longer than the intermediate leg 3. The laminations comprising the core are joined together by any appropriate fastening means, such as rivets 5.

In order to support the core 1, use is made of a container or housing 7 having an upper flange 8. This flange is integrally joined with an outer wall 9 of slightly tapered configuration. This wall 9, as hereinafter explained, is supported on a valve body 10.

A shoulder 11 is formed within the container or enclosure 7, having a surface disposed somewhat below the flange 8. This shoulder serves to support the brackets 12 which are joined to the core 1 as by aid of two of the rivets 5 (FIG. 2). Cap screws 13 threaded into the shoulder 11 serve to attach these brackets to the shoulder or ledge 11.

Disposed around the center leg 3 is an electromagnet coil 14 appropriately held in the position illustrated in FIG. 1 as by appropriate retaining means 15. The flange 8, as most clearly shown in FIG. 2, is provided with recesses 16 for the accommodation of connections to the coil 14. The end flanges 17 of the coil quite closely fit within the central or main space or recess 18 of the container 7.

Cooperating with the core 1 is an armature structure 19. This armature structure 19 is also formed of laminations fastened together as by the aid of rivets 20. The outer legs 21 and 22 are quite short, and the center leg 23 is considerably longer. In this way, the juxtaposed surfaces of the core 1 and the armature 19 form polar areas for pulling the armature 23 upwardly when the coil 14 is energized.

The arrangement is such that when the electromagnet coil 14 is energized, the end legs 2 and 21 as well as the end legs 4 and 22 are in contact, and a small air gap is left between the center legs 3 and 23. In this way, the tendency for the electromagnet to "stick" is overcome and the electromagnet drops out promptly upon a sufficient reduction in the magnetomotive force supplied to the coil 14.

The outer wall 9 has a flange 24 (FIG. 2) by the aid of which it may be fastened as by cap screws 25 to the main valve body 10. A gasket 26 may be interposed between the parts 9 and 10.

The valve body is provided with a threaded inlet opening 27 and a similar outlet opening 28 coupled respectively to the conduits 29 and 30. The inlet and outlet are separated by a wall 31 defining a valve seat 32. A valve closure 33 of yielding material is intended to be moved upwardly in order to establish communication between the inlet and outlet openings of the valve, by energization of the coil 14.

For this purpose, the yielding closure 33 is carried by a metal backing member 34. A washer 36 may overlie said member. Washer 36 and member 34 are clamped together by the aid of a post 35 having terminal threads engaged by a nut 37. The end of the post 35 may be split in order to expand it, to prevent accidental removal of the closure structure from the post 35.

The upper end of the post 35 has a head 38 which is provided with a spherical socket. This spherical socket is mechanically joined to a ball 39 carried by the end of an actuator 40. This actuator 40 is provided with a head 41 that engages a transverse slot 42 formed in the armature structure 19. The slot 42 extends completely across the laminations, so that the actuator 40 can be moved into and out of operative relation with the armature 19 by a mere transverse sliding movement.

The lower wall 43 of the enclosure or container 7 has an opening to permit the passage of the actuator 40 downwardly of this opening. Since the valve structure controlled by the electromagnet may be used for the purpose of supplying liquid or gaseous fuel to a burner, it is necessary to isolate the electromagnet parts from the interior of the valve body. Accordingly, a rubber bellows structure 44 surrounds the actuator 40. The upper end of this rubber bellows is provided with an enlargement 45 held in a recess in the lower surface of the wall 43. It is held in place by an overlying flange 46 fastened as by cap screws 47 to the lower wall 43. The flange is formed at the top of a sleeve 48 which surrounds the rubber bellows 44. This sleeve 48 also serves as a guide for a compression spring 49 urging the closure structure 33 to the closing position.

The lower thickened end of the bellows 44 is received in a cup 50 (see particularly FIG. 3). This cup has an approximate aperture 51 through which post 35 extends. The periphery of cup 50 is provided with slots 52 forming alternate long and short fingers 53, 54, etc. The short fingers, as most clearly shown in FIG. 1, are bent over to contact a washer disposed on top of the enlarged end of the bellows 44, and thereby to attach the lower end of the bellows to cup 50.

An appropriate cover 55 is disposed at the upper rim of the wall 9. It may be held in place by the aid of several cap screws 56 passing through diametrically opposite bosses 57 arranged in the cover 55 and threadedly engaging bosses 58 formed at the upper edge of the wall 9.

In order to reduce the hum due to the use of alternating current, the container 7 may be filled with a viscous liquid, such as oil or silicone. Preferably the container 7 is provided with a rubber diaphragm upper cover 59 and sealingly supported on the flange 8 as by the aid of a ring 60. Cap screws 61 threadedly engaging the flange 8 hold the ring 60 in place.

The flexibility of the cover 59 serves the useful purpose of ensuring against undue restriction of the movement of the liquid within the enclosure provided by the container 7. Thus, as the bellows 44 is compressed due to the upward movement of the armature 19, the liquid squeezed out from the bellows is passed into the container 7; the wall 59 may bulge outwardly to take care of the additional liquid passing into the container 7. The diaphragm or cover 59 can move upwardly in response to expansion of the oil filling as the temperature of the oil increases. This "breathing" thus prevents the occurrence of undue stresses that might otherwise occur if such volume expansion of the container would not occur. To allow this "breathing," i.e., upward movement of the diaphragm or cover 59, it is obvious that the upper surface of diaphragm 59 is exposed to a compressible gas which in the instant construction is separated from the medium controlled by the valve.

The rubber bellows 44 is purposely made quite small in diameter. The inner convolutions of the bellows therefore quite closely approach the periphery of the actuator 40. In order to prevent rubbing and undue wear, a sleeve 62 is disposed over the actuator 40 and is confined between the armature 19 and the upper surface of the post 35. This sleeve is preferably made of Teflon which reduces greatly the friction between the inner folds or convolutions of the bellows 44 and the actuator 40.

In the form shown in FIGS. 4 to 7, inclusive, a base or lower wall 63 is provided as the major support for the laminated core 64 and its cooperating armature 65. These two elements are quite similar to those referred to in connection with the form shown in FIGS. 1 to 3. In the attracted position of FIG. 5, an air gap exists only between the central legs of the core and armature.

In addition to or in lieu of the fastening rivets, such as 66, the laminations may be further fastened by welding together the ears 67 formed integrally with the laminations.

A housing 68 is supported on the bases or wall 63 as by the aid of a ring 69, having a flange clamping the lower flange 69a of housing 68.

Figure 6:
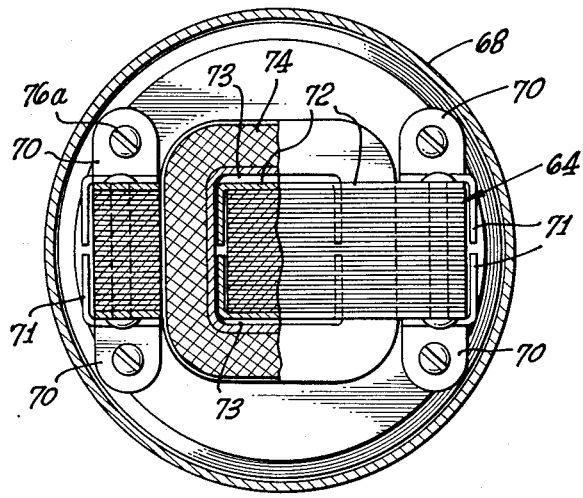
FIG. 6 is a sectional view taken along a plane corresponding to line 6—6 of FIG. 5.

The rivets 66 supporting the core structure 64 are also used to attach the core supporting brackets 70 (see particularly FIG. 7). These brackets 70 are each provided with a side flange 71 that serve as a guide for the armature 65. Furthermore, the brackets 70 are each provided with an upper horizontal cross-piece 72 (FIGS. 6 and 7). Below the center portion of this cross-piece 72 there is an integral U-shaped guide member 73 for guiding the central leg of the armature 65. As shown most clearly in FIG. 7, this guide 73 is offset from the portion 72, in order to contact the coil 74. The coil 74 is appropriately held in position adjacent the short central leg 75 of the electromagnet structure.

The brackets 70 are held in place by the aid of the cap screws 76a threaded into the wall 63.

If desired, the enclosure 68 may be sealed and filled with a viscous liquid as in the form previously described. Furthermore, the actuator 76 in this instance is provided with a lower extension 77 adapted to restrain a ball closure 78 in the deenergized position of FIG. 4.

Figure 5:
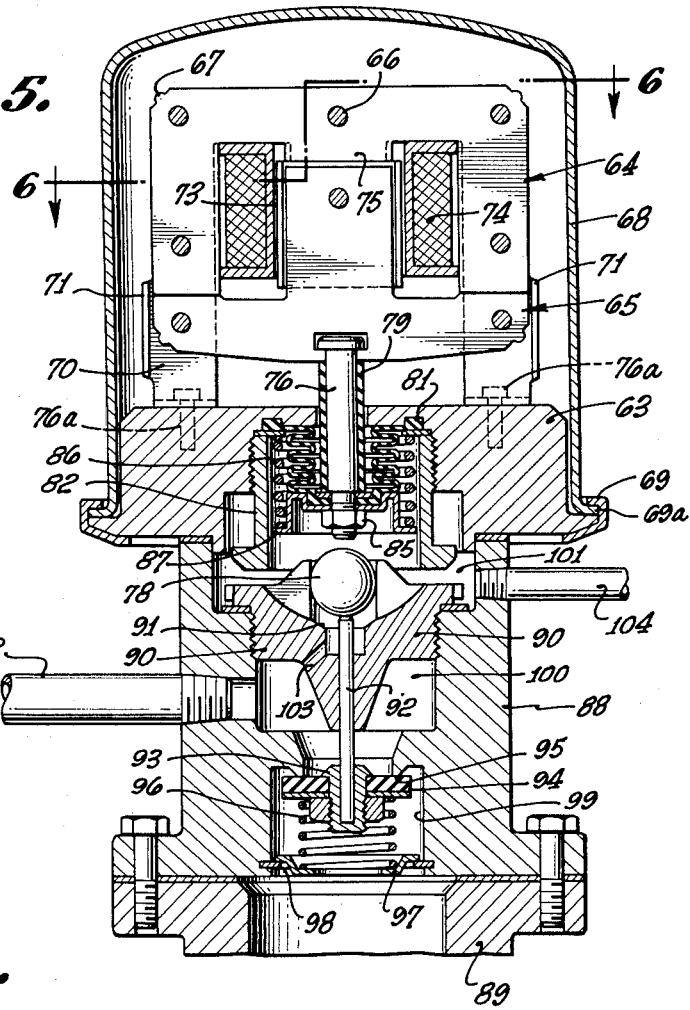
FIG. 5 is a view similar to FIG. 4, but illustrating the electromagnet in energized position.

When the electromagnet is energized, as illustrated in FIG. 5, the actuator 76 is raised, freeing the ball closure 78 so that it may be lifted in a manner to be hereinafter described.

As before, a Teflon sleeve 79 surrounds the actuator 76 to prevent undue friction between this actuator 76 and the rubber bellows 80. This rubber bellows 80 has an enlarged upper flange 81 which is held in place by the upper end of a sleeve 82. This sleeve is threaded into a threaded aperture formed in the wall 63. A washer 83 may be interposed between the upper end of the sleeve 82 and the flange 81 of the bellows 80.

In this instance, the lower end of the bellows has an opening to permit the passage of the reduced end 77 of the actuator 76. This lower end of the bellows 80 fits within a cup member 84 that is held in place by a nut 85 threaded on the end 77. A heavy compression spring 86 operates on a flange 87 formed integrally with the cup 84. This spring urges the actuator 76 downwardly in opposition to the force of the electromagnet.

The wall 63 is appropriately supported over a valve body 88 which may provide means for controlling the flow of gas under pressure to the upper surface of a diaphragm-actuated valve.

Thus the body 88 may be supported above an inlet conduit 89. This body 88 is provided with an insert 90, by the aid of which the ball 78 is guided in its movement and which forms a seat 91 for the ball.

When the electromagnet coil 74 is energized, the ball 78 is lifted off its seat by a rod 92 guided by the aid of the insert 90. The lower end of the rod 92 is disposed in a bushing 93 that carries a yielding valve closure 94. This valve closure cooperates with a seat 95 formed in the body 88. A relatively weak spring 96 urges the closure 94 toward closed position. The lower end of the spring 96 rests upon a ring 97 having its edge restrained by a spring ring 98. This spring ring 98 is disposed in a groove within the passage 99 of the body 88. This passage leads to the chamber or space 100 above the closure 94.

Another chamber 101 is formed above the insert 90 and defined by the wall 63. Communication between the chambers 100 and 101 is controlled by valve closure 78.

When the electromagnet is deenergized, as illustrated in FIG. 4, the spring 86 is strong enough to overcome spring 96 and to cause the ball 78 to be urged strongly against its seat. Under such circumstances, the closure 94 is in open position and gas can flow from the inlet conduit 89 past the closure 94 to a conduit 102. No gas can flow into chamber 101.

In the energized position of FIG. 5, the closure 94 interrupts the flow of gas to the conduit 102. Instead, this conduit 102 is connected via port 103 to the chamber 101, and thence to a vent conduit 104.

This three-way valve may effectively be utilized as a pilot valve for controlling the position of a diaphragm-operated main valve. Thus, in the closed position of FIG. 4, the diaphragm chamber fed from conduit 102 is subjected to inlet pressure and therefore serves to maintain the main valve closed. However, when the electromagnet is energized, as illustrated in FIG. 5, the diaphragm chamber 102 can vent through the conduit 104 and the main valve is permitted to open.

Figure 8:
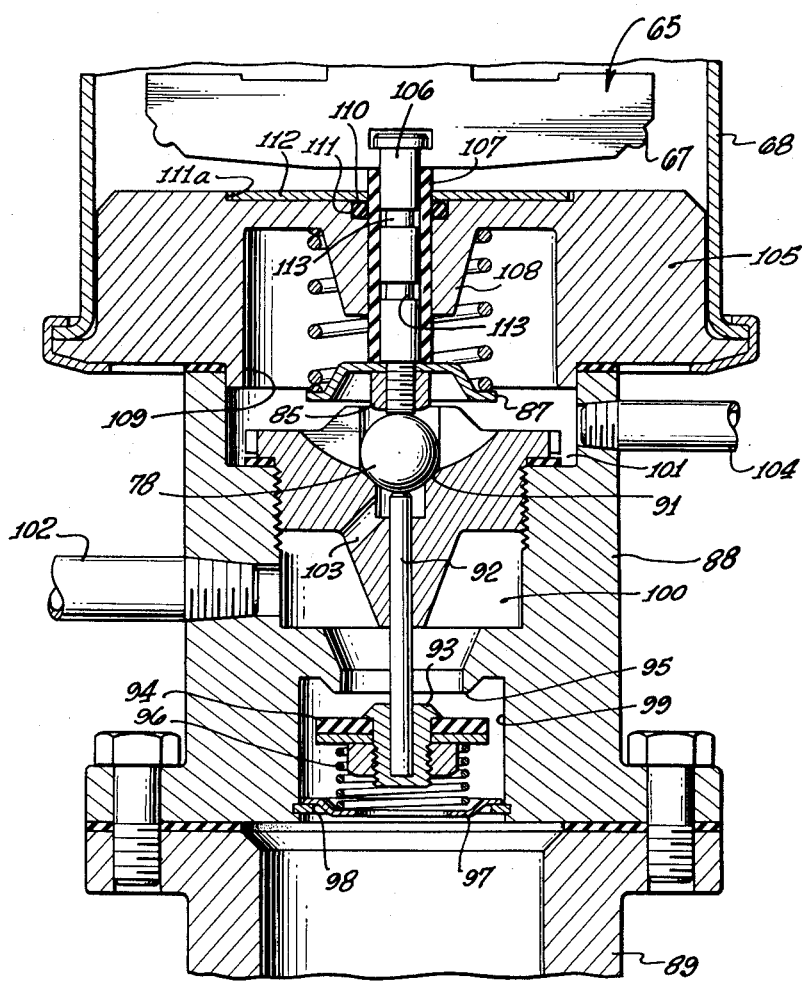
FIG. 8 is a fragmentary sectional view, similar to FIG. 4, of a further modified form of the invention.

In the form shown in FIG. 8, the general structure is quite similar to that disclosed in FIG. 4. The lower wall 105 defines with housing 68, a sealed chamber for the electromagnet structure. The actuator 106 is keyed to the armature 65 so as to be pulled upward to move closure 94 to its seat when the electromagnet is energized, all as heretofore explained.

The actuator 106 extends through a Teflon sleeve 107 that in turn is guided in a boss 108. This boss is integral with base 105 and extends downwardly into recess 109 formed in the lower side of base 105. In order to provide a seal around sleeve 107, a rubber O-ring 110 is confined in a shallow counterbore 111 in the upper surface of base 105. The sleeve 107 is in sealing contact with O-ring 110, which is confined by a plate 112 in counterbore 111a. This plate may be firmly urged against the ring 110, as by screws engaging the base 105.

The exterior surface of sleeve 107 being very smooth, it can readily slide past ring 110 even though sealing contact is established. Furthermore, to maintain a seal between actuator 106 and the interior of sleeve 107, oil or other stable sealing liquid may be placed in grooves 113 formed on the actuator. These grooves are preferably quite shallow.

By virtue of the interposition of the Teflon sleeve 107 between the actuator 107 and the yielding ring 110, the chamber above base 105 is adequately sealed against the ingress of gaseous matter from the valve structure.

The inventor claims:

1. In an electromagnet structure: a core; a coil carried by the core; a movable armature cooperating with the core; wall means supporting the core; an actuator carried by the armature and extending through the wall means; a sealing resilient bellows surrounding said actuator and joined thereto so as to maintain said wall means impervious; and a sleeve disposed around the actuator and made of material that produces low friction between it and the inner folds of the bellows.

2. In an electromagnet structure: a core; an armature; a coil associated with the core and armature; an enclosure for the core, coil and armature and serving to support the core; a movable actuator connected to the armature and extending through a rigid wall of the enclosure; flexible means attached to the wall for sealing the enclosure; and a liquid filling in the enclosure; said enclosure having another flexible wall independently movable of said armature to limit the pressure attained by the liquid in the enclosure said flexible wall being exposed to the pressure of the liquid filling.

3. In an electromagnet structure: a core; a coil carried by the core; a movable armature cooperating with the core; wall means supporting the core; an actuator carried by the armature and extending through the wall means; a sealing resilient bellows surrounding said actuator; and a cup into which the free end of the bellows extends and to which the actuator is joined; said cup having slots in its periphery to form fingers capable of bending to overlie and fasten the free end of the bellows to the cup.

4. In an electromagnet structure: a core having two outside legs and an intermediate leg; a coil surrounding the intermediate leg; a movable armature having three legs cooperating with the three legs of the core; means for supporting the core; said armature having a transverse key slot in its surface that is opposite the surfaces cooperating with the core legs; and a headed actuator movable into and out of the slot so that its head is receivable in the slot.

5. In an electromagnet structure: a core having two outside legs and an intermediate leg; said intermediate leg being substantially shorter than the two outside legs; a coil surrounding the intermediate leg; a movable armature having three legs cooperating with the three legs of the core; means forming a guide for the movement of the armature legs and defining three spaces for the accommodation of said armature legs; a wall means supporting said guide means; and an actuator carried by the armature and extending through an opening in the wall means.

6. The combination as set forth in claim 5 with the addition of a flexible bellows extending away from the armature, surrounding said actuator, the ends of the bellows being respectively sealingly attached to the wall means and to the free end of the actuator.

7. In combination: a container; an electromagnet in the container; said electromagnet having a movable part in the container; and a liquid filling in the container; said container having a cover independently movable of any part of said electromagnet made from yielding resilient material and moving and compensating for the expansion of said liquid filling, said cover confining said liquid filling in said container.

8. The combination as set forth in claim 7, in which said movable part of said electromagnet is an armature; and with the addition of an actuator connected to the armature and effective externally of the container for moving a load.

9. In an electromagnet structure adapted to operate a fluid valve closure: a core; a coil carried by the core; an outer casing; an inner casing; a flange connecting the upper edge of the outer casing with the inner casing; said inner casing being open at the top; said core being disposed in the inner casing; an armature extending into the coil and located in the inner casing; an actuator connected to the armature and extending through the bottom wall of the inner casing and into the outer casing; a liquid filling in the inner casing; a resiliently yielding sealing cover independently movable of said armature for the inner casing; said sealing cover being mounted on said inner casing and being exposed to said liquid filling and yielding means providing a seal around the actuator and carried by the inner casing.

10. In an electromagnet: a coil; a magnetic structure for the coil and having a movable part; an enclosure in which the coil is supported; an actuator moved by the movable part and extending through a rigid wall of the enclosure; flexible means attached to the wall for sealing the enclosure around the actuator; and a liquid filling in the enclosure; said enclosure having another flexible wall independently movable of said part to limit the pressure attained by the liquid in the enclosure, and exposed to the pressure of the liquid in the enclosure.

11. In an electromagnet: a coil; a magnetic structure for the coil and having a movable part; an enclosure around the movable part; an actuator extending out of the enclosure; flexible means attached to the enclosure and to the actuator for sealing the enclosure around the actuator; and a liquid filling in the enclosure; said enclosure having an additional flexible portion independently movable of said movable part and subjected to the pressure of the liquid filling, to govern the pressure attained by the liquid in the enclosure.

12. In a solenoid-operated valve for controlling the flow of fuel wherein there is relative movement between two parts from one condition to another condition when an associated solenoid winding is energized to produce a movement of a valve element, and wherein the part moved is in a closed chamber filled with a fluid and is connected through such chamber with said valve element, and wherein said part moved results in displacement of fluid in said chamber, the improvement which resides in providing said chamber with a flexible wall portion which is independently movable of said parts flexed by the liquid displaced by movement of said part moved to accommodate the fluid displaced thereby.

13. In a solenoid operator wherein there is relative movement between two parts from one condition to another condition when an associated solenoid winding is energized, and wherein such parts are within a chamber filled with fluid, and wherein movement of one of said parts results in displacement of fluid in said chamber, the improvement which resides in providing such chamber with a flexible wall portion which is independently movable of said parts and which is flexed by the fluid displaced by movement of said one part to accommodate the fluid displaced thereby.

14. In a solenoid-operated valve construction, a coil, a magnetic structure for the coil and having a movable part, an enclosure around the movable part, said enclosure including flexible wall means movable independently of said movable part, a liquid in said enclosure confined at least in part by said flexible wall means, a valve element attached to said movable part with movement of said part resulting in displacement of said liquid and flexing of said flexible wall means to accommodate said displacement of said liquid.

15. A solenoid-operated valve, as set forth in claim 14, in which said flexible wall means has two portions, one of which flexes to displace said fluid, and the other one of which flexes to accommodate the fluid displaced by such one portion.

16. A solenoid-operated valve as set forth in claim 15 in which said valve element is movable in a valve chamber and said one portion is subjected to the pressure in said valve chamber.

17. In a solenoid-operated valve construction, a coil, a magnetic structure for the coil and having a movable part, an enclosure around the movable part, said enclosure including flexible wall means movable independently of said movable part, a liquid filling in said enclosure confined by said flexible wall means, a valve element attached to said movable part with movement of said part flexing a portion of said flexible wall means to tend to change the volume of said chamber and with a portion of said wall means being flexed by fluid acting thereon to overcome the tendency of said volume to change, said liquid being in free communication with both said portions.

18. In an electromagnet construction, a coil, a magnetic structure for the coil and having a movable part, an enclosure around the movable part, said enclosure including flexible wall means movable independently of said movable part, a portion of said flexible wall means being attached to said part and flexed upon movement thereof, said flexible wall means having a second portion flexed by displacement of fluid resulting from movement of said part.

19. In an electromagnet construction, a coil, a magnetic structure for the coil and having a movable part operated upon energization of the coil, an enclosure around the movable part, said enclosure including flexible wall means movable independently of said movable part, and liquid in said enclosure confined at least in part by said flexible wall means, said liquid being confined such that temperature change in said fluid results in flexing of said wall means.

20. In a solenoid-operated valve construction, a coil, a magnetic structure for the coil and having a movable part, an enclosure around the movable part, said enclosure including flexible wall means movable independently of said movable part, fluid in said enclosure confined at least in part by said flexible wall means, a valve member movable in a valve chamber and connected with said movable part, said flexible wall means having a portion exposed to pressure in said valve chamber, said portion being in free fluid communication with a second portion of said flexible wall means with flexing of the first mentioned portion in a direction to tend to decrease the interior size of said enclosure results in flexing of said second portion in a direction to enlarge said enclosure.

21. In a solenoid-operated valve for controlling the flow of fuel wherein there is relative movement between two parts from one condition to another condition when an associated solenoid winding is energized to produce a movement of the valve element in a valve chamber, and wherein the part moved is in a closed chamber filled with a liquid, the improvement which resides in providing said chamber with flexible wall means movable independently of said parts having a first portion exposed to pressure in said valve chamber and in free fluid communication with a second portion of said flexible wall means such that inward flexing of said first portion tending to diminish the size of said chamber results in outward movement of said second portion to enlarged said chamber.

22. A solenoid-operated valve as set forth in claim 12 in which said flexible wall portion has a portion exposed to a compressible gas separated from said fuel.

23. A solenoid operator as set forth in claim 13 in which said flexible wall portion has a portion exposed to a compressible gas.

24. A solenoid-operated valve as set forth in claim 14 for controlling the flow of a medium in which said flexible wall means has a portion exposed to a compressible gas separated from said medium controlled by the valve.

25. A solenoid-operated valve as set forth in claim 17 for controlling the flow of a medium in which said flexible wall means has a portion exposed to a compressible gas separated from said medium.

26. An electromagnet construction as set forth in claim 18 in which said flexible wall means has a portion exposed to a compressible gas.

27. An electromagnet construction as set forth in claim 19 in which said flexible wall means has a portion exposed to a compressible gas.

28. A solenoid-operated valve as set forth in claim 20 for controlling the flow of a medium wherein said flexible wall has a portion exposed to a compressible gas separated from said medium.

29. A solenoid-operated valve as set forth in claim 21 in which said flexible wall means has a portion exposed to a compressible gas separated from said fuel.

References Cited in the file of this patent

UNITED STATES PATENTS

| | | |
|---|---|---|
| 2,098,331 | Bowman | Nov. 9, 1937 |
| 2,360,744 | Valkenburg et al. | Oct. 17, 1944 |
| 2,383,088 | Shaw | Aug. 21, 1945 |
| 2,544,491 | Davis | Mar. 6, 1951 |
| 2,770,972 | Gratzmuller | Nov. 20, 1956 |
| 2,855,548 | White | Oct. 7, 1958 |
| 2,922,614 | Nickells | Jan. 26, 1960 |
| 2,975,340 | Jencks et al. | Mar. 14, 1961 |
| 2,985,802 | Drenning | May 23, 1961 |

FOREIGN PATENTS

| | | |
|---|---|---|
| 559,831 | Great Britain | Mar. 7, 1944 |
| 771,404 | Great Britain | Apr. 3, 1957 |